United States Patent
Conant et al.

[11] Patent Number: 6,151,558
[45] Date of Patent: Nov. 21, 2000

[54] ULTRASONIC MARINE SPEEDOMETER SYSTEM

[76] Inventors: James R Conant, 34 Deerfield Rd., Brookfield, Conn. 06804; Szeeming Yao, 15 Tally Dr., Norwalk, Conn. 06851

[21] Appl. No.: 09/021,538

[22] Filed: Feb. 10, 1998

[51] Int. Cl.[7] .............................. G01F 1/00; G01F 7/00; G01F 1/66; G06F 19/00
[52] U.S. Cl. ..................... 702/48; 702/45; 73/861.27
[58] Field of Search .................. 702/45, 48, 54, 702/FOR 127, 128, 150, 158, 110, 123, 142, 96, 100, 50, 46, 56, 99, 103, 104, 143, 176, 178; 377/19, 21; 367/89, 90, 91; 340/984; 73/861.27, 861.28

[56] References Cited

U.S. PATENT DOCUMENTS

| | | | |
|---|---|---|---|
| 2,669,121 | 2/1954 | Garman et al. | 73/194 |
| 2,826,912 | 3/1958 | Kritz | 73/194 |
| 3,097,526 | 7/1963 | Fischbacher | 73/861.29 |
| 3,653,259 | 4/1972 | McShane | 73/194 A |
| 3,751,979 | 8/1973 | Ims | 73/194 A |
| 3,835,704 | 9/1974 | Elazar et al. | 73/861.28 |
| 4,069,713 | 1/1978 | Gassmann | 73/194 A |
| 4,210,965 | 7/1980 | Ingram | 367/26 |
| 4,232,548 | 11/1980 | Baumoel | 73/861.28 |
| 4,417,481 | 11/1983 | Krause | 73/861.28 |
| 4,557,148 | 12/1985 | Akiyama | 73/861.28 |
| 4,685,093 | 8/1987 | Gill | 367/89 |
| 4,774,837 | 10/1988 | Bird | 73/181 |
| 4,926,395 | 5/1990 | Boegman et al. | 367/89 |
| 5,343,744 | 9/1994 | Ammann | 73/170.13 |
| 5,544,076 | 8/1996 | Wiggerman et al. | 364/565 |
| 5,583,289 | 12/1996 | Wiggerman et al. | 73/182 |

FOREIGN PATENT DOCUMENTS

WO 02/10763  6/1992  European Pat. Off. .......... G01P 1/00

*Primary Examiner*—Marc S. Hoff
*Assistant Examiner*—Manuel L. Barbee
*Attorney, Agent, or Firm*—OURPAL® Asija

[57] ABSTRACT

Methods, devices and system for measuring the speed of the watercraft relative to the water through which it travels. An embodiment comprises two streamlined fins configured to extend at least partially below the waterline. The fins are oriented parallel to the water flow so that as the watercraft moves, the water flows in between the fins in a smooth unobstructed motion. One piezoelectric transducer is mounted in each fin so that the acoustic signal path between the transducers is a straight line. The transducers are offset upstream and downstream so that water flow between the fins can significantly affect the acoustic signal travel time between the upstream and downstream sensors.

6 Claims, 7 Drawing Sheets

$$t_{UD} = \frac{d_w}{c+s} + t_{other} \quad \text{------------------------} 111$$

$$t_{DU} = \frac{d_w}{c-s} + t_{other} \quad \text{------------------------} 112$$

$$\frac{1}{t+} - \frac{1}{t-} = \frac{2s}{d_w} \quad \text{-----------------------------} 113$$

$$x = A\sin(0-\emptyset) + dc = -A\sin(\emptyset) + dc \quad \text{-------------} 114$$

$$y = A\sin(\tfrac{\pi}{2}-\emptyset) + dc = A\cos(\emptyset) + dc \quad \text{-------------} 115$$

$$u = A\sin(\pi-\emptyset) + dc = A\sin(\emptyset) + dc \quad \text{-------------} 116$$

$$v = A\sin(\tfrac{3\pi}{2}-\emptyset) + dc = -A\cos(\emptyset) + dc \quad \text{-----------} 117$$

$$\emptyset = \sin^{-1}\left\{\frac{(u-x)}{2A}\right\} \quad \text{--------------------------} 118$$

$$2A = \sqrt{(x-u)^2 + (y-v)^2} \quad \text{------------------} 119$$

$$t = \frac{\sin^{-1}\left\{\dfrac{(u-x)}{2A}\right\}}{2\pi f} \quad \text{----------------------} 120$$

*Fig. 6*

ULTRASONIC MARINE SPEEDOMETER SYSTEM

BACKGROUND

This invention relates to ultrasonic flowmeters. More particularly to a marine speedometer used in the measurement of the speed of a marine vessel, craft, or boat.

THE PROBLEM

The problems with prior art marine speedometers can be categorized into the following:

a) Inaccurate b) Sensitive to water temperature and salinity c) Sluggish response time d) Too many moving parts e) Require manual calibration f) Susceptible to corrosion or marine growth e) Complex, cumbersome and therefore not cost effective.

SUMMARY

The system of this invention provides a high quality, quick, cost effective, accurate, reliable ultrasonic flowmeter marine speedometer that is not sensitive to water temperature and salinity and is not susceptible to corrosion and marine growth.

The present invention generally provides an apparatus configured for insertion into a fluid for the measuring the speed of the fluid with respect to the apparatus. The speed of fluid is measured by transmitting an acoustic signal both upstream and downstream in the fluid, then computing the difference of the reciprocal of the transit times. The transit times of the acoustic signal are determined through direct phase measurement. The direct phase measurement is provided by digital signal processing of analog-to-digital converted samples of the acoustic signal.

According to one aspect of the invention, the apparatus is of the type which may be attached to a watercraft for measuring the speed of the watercraft relative to the water through which it travels.

An embodiment of the apparatus for measuring the speed of a watercraft includes two streamlined fins configured to extend at least partially below the water-line. The fins are oriented parallel to the water flow so that as the watercraft moves, the water flows in between the fins in a smooth unobstructed motion. One piezoelectric transducer is mounted in each fin so that the acoustic signal path between the transducers is a straight line. The transducers are offset upstream and downstream so that water flow between the fins can significantly affect the acoustic signal travel time between the upstream and downstream sensors.

PRIOR ART

A preliminary limited prior art search was conducted and furthermore the inventor is intimately familiar with the prior art. Following are typical examples of the prior art known to the inventor or his attorney arranged in the reverse chronological order for ready reference of the examiner and the reader.

AA) U.S. Pat. No. 5,583,289 awarded to Wiggerman et al on Dec. 10, 1996 for "Marine Velocity Detection Device with Channel to Wash Out Debris"

BB) U.S. Pat. No. 5,544,076 also issued to Wiggerman et al on Aug. 6, 1996 for "Marine Speedometer"

CC) U.S. Pat. No. 5,343,744 granted to Stephen Ammann on Sep. 6, 1994 for "Ultrasonic Anemometer"

DD) U.S. Pat. No. 4,926,395 bestowed upon Boegemann et al on May 15, 1990 for "Method and System for Measuring Sound Velocity"

EE) U.S. Pat. No. 4,774,837 granted to Jeremy Bird on Oct. 4, 1988 for "Transducer Assembly for a Speed Measurement Device"

FF) U.S. Pat. No. 4,685,093 presented to Michael Gill on Aug. 4, 1987 for "Speed Measurement Device"

GG) U.S. Pat. No. 4,417,481 honorably given to Gerhard Krause on Nov. 29, 1983 for "Apparatus for Measuring the Speed of Flow of a Flow-able Medium by Determining the Transit Time of Sound Waves Therein."

HH) U.S. Pat. No. honored upon Gerhard Gassmann on Jan. 24, 1978 for "Arrangement for Determining Liquid and Gas Flow Rates"

II) U.S. Pat. No. 3,751,979 honorably earned by John Robert Ims on Aug. 14, 1973 for "Speed Measurement System"

JJ) U.S. Pat. No. 3,653,259 issued in the name of James McShane on Apr. 4, 1972 for "Ultrasonic Flowmeter Systems"

KK) U.S. Pat. No. 2,826,912 published in the name of Jack Kritz on Mar. 18, 1958 for "Acoustic Velocity Measuring System"

LL) U.S. Pat. No. 2,669,121 honored upon Garman et al on Feb. 16, 1954 for "Supersonic Flow Meter"

Highly accurate measurements of speeds are required in particular marine applications such as competition waterskiing and sailboat racing. For example, the American Water Ski Association requires speeds accurate to 0.4 MPH (Miles Per Hour) for record slalom course passes. Sailboat racing crews work to achieve speed increases measured in hundredths of a knot.

Devices for measuring the speed of watercraft have commonly been used in the past. Such devices are essentially fluid flow rate meters, and are mounted on a boat and include a transducer or "pick-up" in the water attached to the hull. Such devices can be classified by the different types of transducers employed.

One prevalent type of speed measurement device is based on various kinds of pitot tubes such as Hobbs, U.S. Pat. No. 5,110,310, Davis, U.S. Pat. No. 5,142,473, and Refoy, U.S. Pat. No. 4,205,552. Such systems are prone to clogging, require adjustments to compensate for day-to-day changes in ambient atmospheric pressure, require adjustments to compensate in differences in water density due to temperature or salinity, and respond slowly to changes in speed due to the long pressure conduit from the pitot tube to the display unit. In Wiggerman et al, U.S. Pat. No. 5,544,076, improvements to a pitot tube based speedometer are described that alleviate some of these problems, but the speedometer must still be calibrated manually to achieve high accuracy.

Other types of marine speed measurement devices measure the rotational speed of a free-wheeling paddle-wheel or propeller. These devices require manual calibration, respond slowly and are insensitive to small changes in speed, and require a rotating mechanism which is difficult to maintain under conditions promoting corrosion and marine growth.

Ultrasonic flowmeters have the potential to overcome all of the above mentioned problems. Ultrasonic flowmeters measure fluid flow speed by measuring the transit time for acoustic signals transmitted upstream and downstream. As is well known in the literature (see Dual Path Ultrasonic Measurement of Fluid Flow, A. E. Brown), the difference between the reciprocal of upstream and downstream transit times is proportional to the fluid flow rate, independent of the speed of the acoustic signal in the fluid. Ultrasonic flowmeters are widely used in industry, and have been applied to large marine vessels (U.S. Pat No. 3,898,878, Stallwood et al) and to small boats (U.S. Pat No. 4,685,093, Gill). Ultrasonic flowmeters are highly accurate, are not sensitive to water temperature or salinity, can be implemented with very fast response times, do not require manual calibration, and have no moving parts that are susceptible to corrosion or marine growth.

Ultrasonic flowmeters as described in Stallwood and Hartley, and Gill have not been applied to recreational powerboats and sailboats for three reasons: the transducers must be mounted far apart from each other on the ships hull, the transducers and associated housing are large, and the flowmeters are very expensive. The transducers are mounted far apart to provide sufficient accuracy for measuring small speed changes. Large transducers must be used to generate sufficient acoustic signal power to transmit the signal over the large distance to the receiving transducer.

Generating a strong acoustic signal requires expensive electronic means to amplify the electronic signal.

Furthermore, embodiments of ultrasonic flowmeters as described in previous work require expensive processing electronics or cannot accurately measure transit times down to a few nanoseconds. One kind of ultrasonic flowmeter uses continuous wave or amplitude-modulated acoustic signals with transit times determined by various phase detectors such as a phase-lock loop (see for example U.S. Pat. No. 3,751,979), detecting zero-crossings (see for example U.S. Pat. No. 4,685,093) or correlation with the transmitted signal (see for example U.S. Pat. No. 4,069,713). These methods are expensive when attempting to determine transit times with nanosecond accuracy. A second kind of ultrasonic flowmeter (see for example U.S. Pat. Nos. 3,653,259 and 3,901,078) uses pulsed acoustic signals with transit times determined by threshold crossings of received pulses. These methods are inherently not capable of nanosecond transit time accuracy due to pulse dispersion and uncertainties associated with threshold detection.

Unfortunately none of the prior art devices singly or even in combination provide all of the features and objectives established by the inventor for this system as enumerated below.

OBJECTIVES

1. It is an objective of this invention to provide methods, devices and system for measurement of the speed of a marine vessel, craft or boat utilizing ultrasonic flowmeters.
2. Another objective of this invention is to provide a marine speedometer system that is of high quality, cost effective, accurate and reliable.
3. Another objective of this invention is that it be made of modular units easily interface-able to each other.
4. Another objective of the marine speedometer of this invention is that it have a fast response time.
5. Another objective of the marine speedometer of this invention is that it be solid state with minimal moving parts.
6. Another objective of this invention is that it obviate manual calibration.
7. Another objective of the marine speedometer of this invention is that it be minimally susceptible to corrosion or marine growth.
8. Another objective of this invention is that it can be adapted for other uses.
9. Another object of the present invention is to provide a marine speedometer in the form of a inexpensive ultrasonic flowmeter, that is compact and easily mounted on a watercraft hull.

In summary it is the goal of the present invention to provide an ultrasonic flowmeter which provides all the advantages of previous art (with nanosecond transit time measurement accuracy), and is also inexpensive.

BRIEF DESCRIPTION OF THE DRAWINGS a) FIG. 1 is a schematic view of the hull of a ship to which an embodiment of the invention is mounted.

b) FIG. 2 is a perspective view of the housing for mounting the piezoelectric transducers and associated electronic circuitry.

c) FIG. 3 is a more detailed view of the mounting of the piezoelectric transducers 20, 21 in the cavities 30, 31.

d) FIG. 4 is a diagrammatic view of the ultrasonic flowmeter showing the transducers and accompanying circuitry.

e) FIG. 5 (a) is a flow chart illustrating the signal processing operation of the ultrasonic flowmeter.

f) FIG. 5 (b) is a flow chart illustrating the determination of the quadrant of a sample of a signal.

g) FIG. 6 shows the equations for calculation of the transit time between upstream and downstream piezoelectric elements as well as the sampling rate equations for computation of the phase time of the received signal which in turn permits the calculation of the speed of the marine vessel.

DETAILED DESCRIPTION OF THE PREFERRED EMBODIMENT

Figure 1:
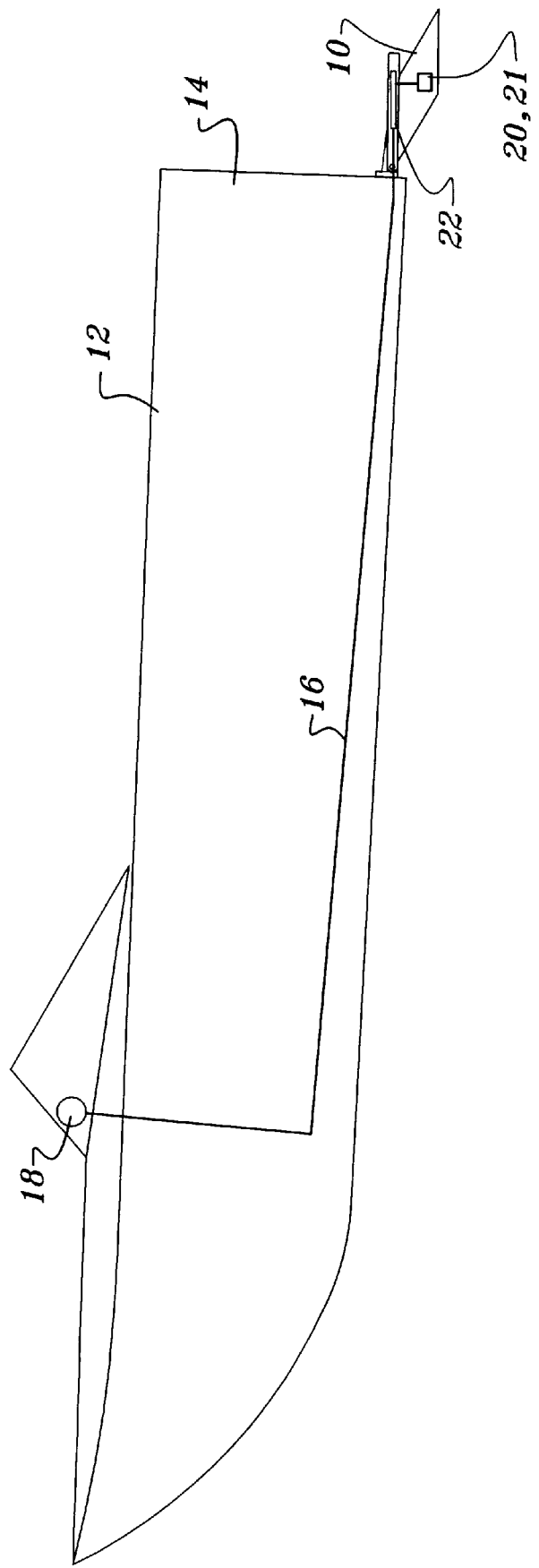

The ultrasonic marine speedometer system of this invention as shown in the drawings wherein like numerals represent like parts throughout the several views, there is generally disclosed in FIG. 1 a schematic diagram of a marine speedometer system 10 in accordance with a preferred embodiment of the present invention employed on a watercraft 12 (e.g. sailboat, power boat, or other marine vessel). The marine speedometer system 10 is mounted on the transom 14 of the watercraft 12. The marine speedometer system 10 communicates speed measurements to a display 18 using digital asynchronous communications over conductors 16 (e.g. RS232). The marine speedometer system includes 2 piezoelectric transducers 20,21 that are electrically coupled to processing electronics 22.

Figure 2A:
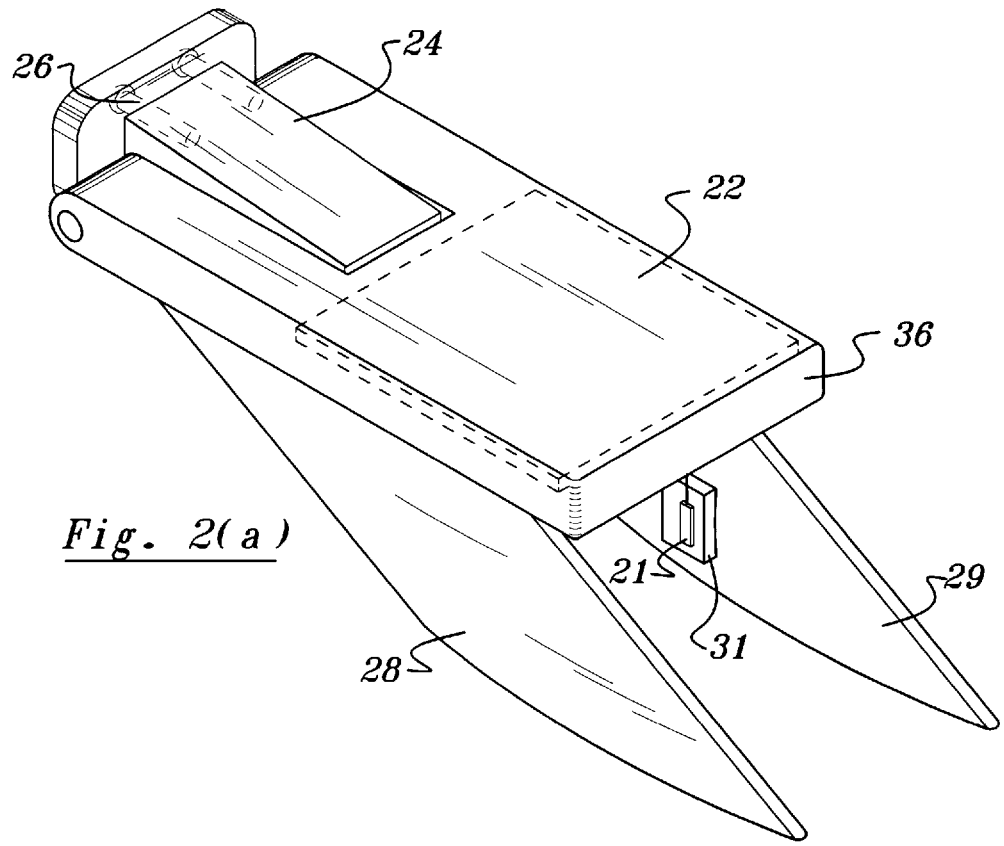
Figure 2B:
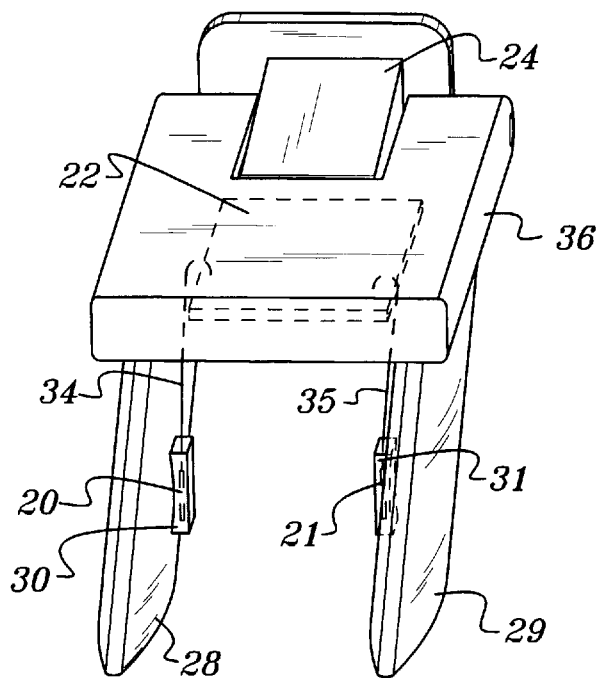

FIG. 2 is a perspective view of the marine speedometer system 10. The system 10 is fastened to the watercraft transom 14 by a mounting bracket 24 and fasteners, such as screws 26. The system 10 is mounted on the watercraft transom 14 so that the piezoelectric transducers 20,21 are in a smooth water flow below the boat hull during normal operation.

It should be noted that the fluid flow rate device 10 could be used in other situations. For example, it could be mounted at a fixed point for measuring the velocity of fluid moving past it.

Piezoelectric transducers 20,21 are mounted in cavities 30, 31 in streamlined fins 28,29. The fins must be strong and rigid so that the fins do not vibrate when exposed to a high-speed water flow. The fins 28,29 are streamlined with an elliptical or hydrofoil cross-section. The cavities 30,31 are placed on the upstream half of the fins 28,29 where there is little chance of the water flow separating from the fin surface. The streamlined trailing half of the fins 28,29 reduces the surface spray and hydrodynamic drag. Reducing spray is important in water sports such as waterskiing, and reducing hydrodynamic drag is important in sailboat racing.

The piezoelectric transducers 20,21 are connected to the processing electronics 22 via a pair of conductors 34,35. The processing electronics 22 are connected to the display unit 18 via a pair of conductors 16. Conductors 16 also includes two conductors for power supply to the processing electronics. The processing electronics 22 are placed in a large cavity in the upper housing and encapsulated in a urethane potting material to keep water out of the electronics.

Figure 3:
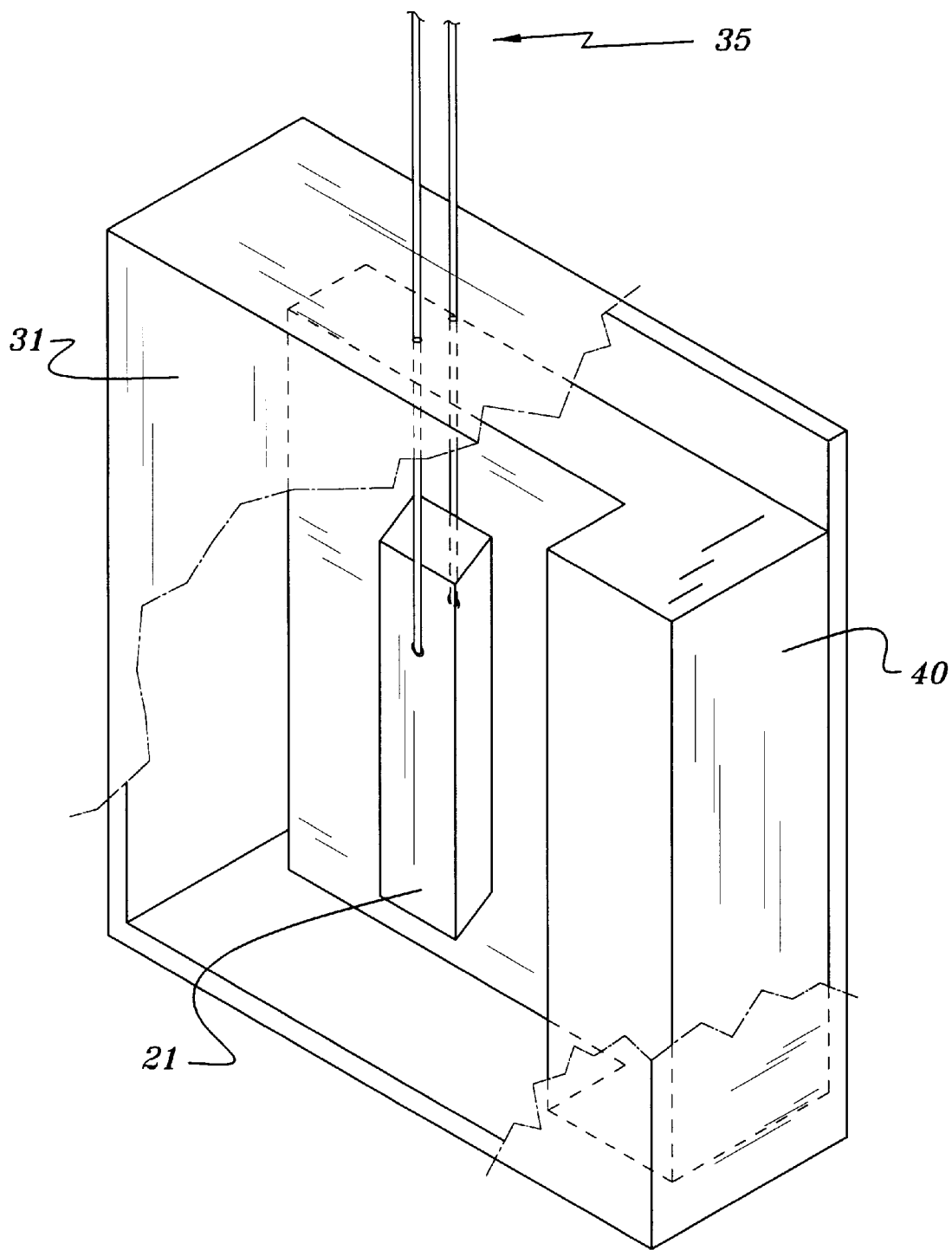

FIG. 3 is a more detailed view of the mounting of the piezoelectric transducers 20, 21 in the cavities 30, 31. In the preferred embodiment, each piezoelectric transducer is a PZT-4 or PZT-8 rectangular element of size 17 mm×3 mm×1.5 mm. The element operates in its width-mode resonance at 571 KHz frequency.

The element length is chosen so that the transmitted near field extends dw (to the receiving element). The transducer was chosen to operate in the 500–600 KHz region because of high slew rate (improves the measurement accuracy), lack of noise from boat exhaust and water flow, and reduced interference from fish and depth sonars (which typically operate at lower frequencies).

Higher frequencies (1 MHz and above) require more expensive electronics and are more susceptible to signal degradation due to air bubbles and other minute debris in the water. The elements are surrounded by closed-cell foam corner reflectors 40 to produce a beam at 45 degrees to the face. This also produces a 3 db beam gain. The entire assembly is potted in a polyurethane to seal the transducer from the surrounding fluid.

Figure 4:
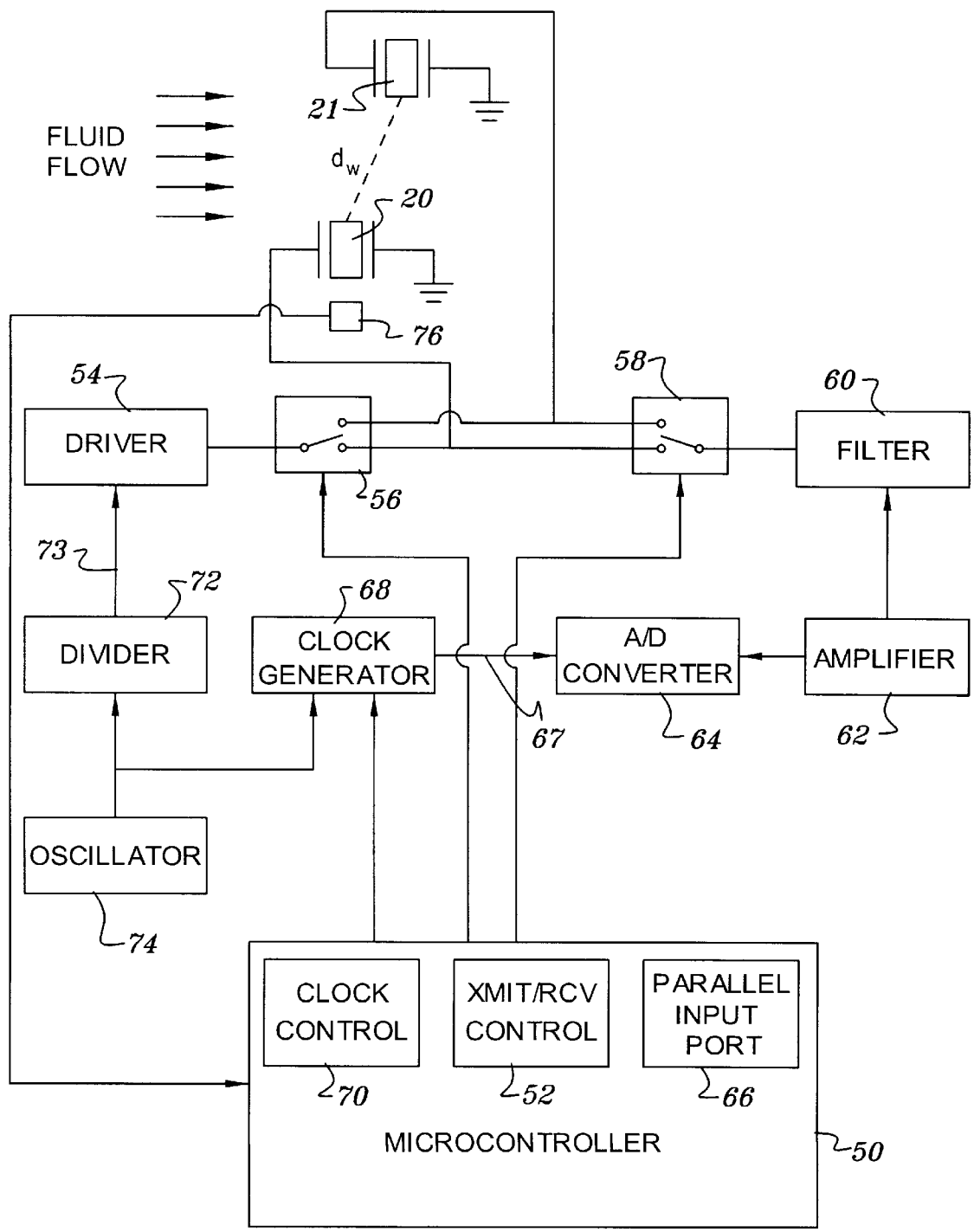

FIG. 4 is a diagrammatic view of the ultrasonic flowmeter showing the transducers and accompanying circuitry. Fluid flows between the upstream 20 and downstream 21 piezoelectric transducers. Initially a micro-controller 50 sets transmit/receive control pins 52 so that the signal output of a driver 54 is applied to the upstream piezoelectric transducer 20 via a switch 56, and so that the signal output of the downstream piezoelectric transducer 21 is applied to a filter 60 via a switch 58.

The filter is a high-pass or band-pass filter which removes unwanted signal energy due to boat exhaust noise, flow noise, and other signals as may be generated by a depth finders or a fish sonar. The filtered received signal is fed to an amplifier 62 which boosts the signal to span the input signal range of an analog-to-digital converter 64.

The digital output of the analog-to-digital converter 64 is read by a parallel input port 66 of the micro-controller 50. The micro-controller 50 then stores and processes the digital sample in accordance with FIG. 5. The exact time at which the analog-to-digital converter 64 samples the received signal is determined by a sampling clock pulse signal 67 generated by a sampling clock generator 68. The sampling clock generator 68 is controlled by sampling clock control pins 70 of the micro-controller 50. Depending on the state of the sampling clock control pins 70, the sampling clock generator 68 will supply a sampling clock signal 67 that is delayed by 0, Pai/4, Pai/2, or 3Pai/4 radians of the periodic transmitted signal 73. An oscillator 74 provides a common time-base to the divider 72 and the sampling clock generator 68 so that sampling clock 67 can maintain a precise phase relationship with the transmitted signal 73. This precise phase relationship is the underlying means by which the micro-controller 50 can compute an accurate acoustic signal transit time between transducers 20 and 21.

Once a set of samples of the received signal has been taken while the upstream transducer 20 is transmitting to the downstream transducer 21, the micro-controller 50 changes the transmit/receive control 52 so that the switches 56,58 cause the downstream transducer 21 to become the transducer and the upstream transducer 20 to become the receiver. A second set of samples is then taken and processed in accordance with FIG. 5.

In a preferred embodiment the micro-controller 50 is an 8 or 16-bit micro-controller that can perform 16-bit fixed point arithmetic quickly and has an 8 bit parallel input port 66. The oscillator 74 is a 16 Mhz clock oscillator which provides a square-wave output. The divider 72 and sampling clock generator 68 are embodied in a complex programmable logic device. The divider 72 divides the 16 MHz oscillator output by 28 to produce a 571 KHz square wave transmit signal 73. The sampling clock generator 68 also provides a 571 KHz square wave sampling clock 67 that is delayed by 0, 7, 14, or 21 counts (corresponding to 0, Pai/4, Pai/2, or 3Pai/4 radians) from the transmit signal 73. The driver 54 is a simple one-transistor common-emitter amplifier which can drive the approximately 500 pF capacitance of the piezoelectric elements 20,21. Switches 56,58 are analog FET-based switches. Filter 60 is a high-pass filter implemented with an inductor shunting the received signal to ground. The 3-dB down point of the filter is at 400 KHz.

The amplifier 62 is embodied as two high slew-rate op-amps providing a gain of about ?? and an output signal range of 0 to 2V. The A/D converter 64 is a high-speed 10 Msps 8-bit converter. A temperature sensor 76 may be embedded in the potting material with one of the piezoelectric transducers 20,21 to allow the micro-controller to compensate for delay changes through the potting material as a function of temperature.

Figure 5A:
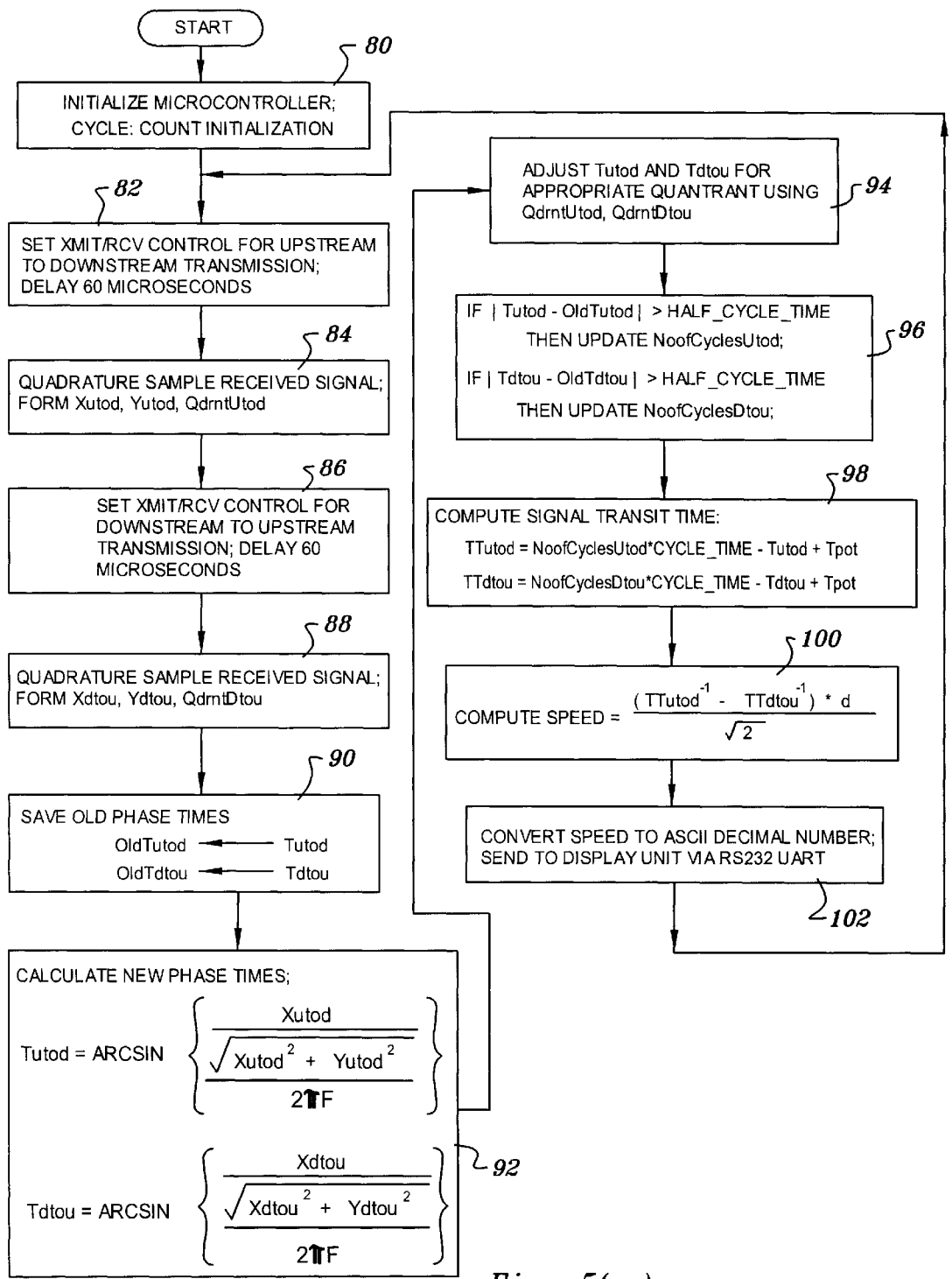

FIG. 5 is a flow-chart illustrating the signal processing performed by the micro-controller 50. At start-up 80, the micro-controller is initialized so that its input/output pins are set to control and communicate with the surrounding circuitry and the display 18. Also, a temperature measurement of the potting material is made with the temperature sensor 76. The potting material is immersed, and will have close to the same temperature as the water. The temperature measurement is used to initialize the cycle counts NoofCyclesUtod and NoofCyclesDtou. These cycle counts represent the signal transit time upstream-to-downstream and downstream-to-upstream to the nearest cycle.

In the next process 82, the transmit/receive control sets the analog switches 56,58 so that the upstream transducer 20 is the transmitter and the downstream transducer 21 is the receiver.

The micro-controller then waits for 60 microseconds to allow the acoustic signal to propagate to the receiver and for any transient responses in the receiver electronics to settle.

In the next process 84, the received signal is plurality (quadrature) sampled at 0, Pai/4, Pai/2, and 3Pai/4 radians delay from the transmitted signal. Samples corresponding to these four delay times are designated X, Y, U, V. In the preferred embodiment, each sample is read 128 times and accumulated to reduce measurement variance. Then the samples for upstream to downstream transmission Xutod, Yutod are calculated as |X−U| and |Y−V| respectively.

Figure 5B:
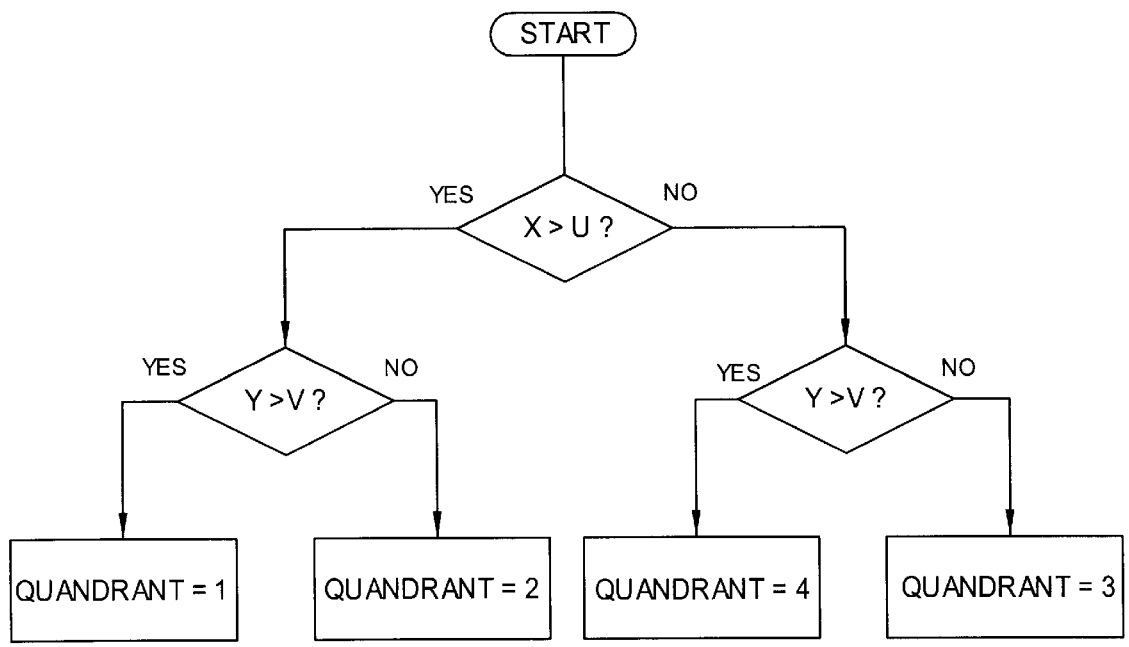

The quadrant of the received signal that the X sample corresponds to is designated QdrntUtod, and is determined by the process illustrated by the flow-chart of FIG. 5(b).

Once all samples in the upstream to downstream transmit/receive configuration have been taken, and Xutod, Yutod, and QdrntUtod have been formed as described in the preceding paragraph, the process is repeated over with the downstream to upstream transmit/receive configuration (86 and 88). Xdtou, Ydtou, and QdrntDtou are formed in these two process steps.

Direct inverse function is computed as follows:

Let the transmitted waveform be a continuous periodic waveform F(wt), and the received continuous periodic waveform voltage y(t) be of the form F(wt-Theta). Theta is the key parameter to estimate, because the transit time is theta/w, sampling the received waveform at time t1 produces a waveform sample value y(t1).

Direct inverse function computation means that there exists a function F(exp−1) so that F(exp−1)(y(t1))=wt1+ Theta. Because the sampling is done at the same frequency, w is known. Furthermore, because the sampling is done synchronously, t1 is known. Therefore, by computing F(exp−1) (y(t1)) and subtracting wt1, Theta can be estimated.

A simpler way of thinking about direct inverse function computation, is that the amplitude of the received wave at a fixed point in time can be used to compute the phase of the wave. Threshold crossings or zero crossings do not have to be located, and correlations do not have to be performed.

This sampling scheme embodies two important advantages of the invention.

First, since the received signal is continuous, narrow-band, and periodic, the micro-controller can read the A/D converter at rates significantly below the signal frequency. This enables a slower, less expensive micro-controller to be used.

The second advantage is the use of plurality (quadrature) sampling in the formation of Xutod and Yutod. By forming Xutod=|X−U|, and Yutod=|Y−V|, distortion due to even harmonic distortion is suppressed. The 2nd harmonic is present in the transmitted signal because the transmitting piezoelectric transducer is driven by a square wave to reduce costs.

Also, non-linearities in the A/D converter can produce harmonic distortion. Quadrature or other plurality sampling helps to reduce the effect of these non-linearities and improve the accuracy of the system.

At this point in the process (90), the old phase times are stored in micro-controller memory. Then the new phase time Tutod is calculated (92) as the inverse sine of the quantity Xutod divided by an estimate of the signal amplitude sqrt(Xutod2+Yutod2).

In a similar fashion Tdtou is calculated. Note that other inverse trigonometric functions could be used (inverse tangent, inverse cosine) to calculate the phase times by employing appropriate algebraic combinations of Xutod and Yutod, Xdtou and Ydtou.

In step 92, the argument to the inverse sine function will always be in the interval [0,1]. Thus the inverse sine will range over [0, Pai/4] which corresponds to quadrant I. However, the received signal can exhibit phase shifts over all four quadrants. At process step 94 cycle times Tutod and Tdtou are adjusted if the corresponding QdrntUtod and QdrntDtou indicate that the phase times lie in quadrants II, III, or IV.

It may be the case that the received signal crosses a cycle boundary between successive updates of Tutod,Tdtou. In this case the difference between Tutod and OldTutod will be greater than half of the cycle time.

It is physically impossible for the watercraft to accelerate or decelerate at such a rate as to produce a change greater than half a cycle time between successive samples, so the process 96 adjusts the number of cycles to account for the crossing of the cycle boundary.

At this point the total signal transit time can be computed as shown in process step 98. The factor Tpot is used to adjust the transit time for the delay through the potting material that encapsulates the sensors. This delay can change substantially with temperature, so in the preferred embodiment, Tpot is a function of the measurement of the temperature sensor 76. Tpot can be a simple linear function of temperature or can be embodied as a look-up table.

Finally, the speed is computed as shown in process step 100. In process step 102 the binary number representing speed is converted to an ASCII decimal number and sent to a display unit 18. Averaging or filtering of the speed estimates may be employed to provide values for display that do not change to quickly.

OPERATION

The operation and use of the marine speedometer system of this invention is simple and even intuitive. Nonetheless the inventor provides the following explanation for principle of operation of the ultrasonic speedometer of this invention.

A sensor is configured as shown in FIG. 4. U (20) and D (21) are two piezoelectric transducers, spaced dw inches apart. U is the upstream sensor and D is the downstream sensor. The sensor is mounted so that the signal path between U and D is at an angle to the water velocity. Arbitrary angles may be used as long as there is some substantial component of the water velocity along the signal path. For purposes of simplicity in presenting the equations, a 45 degree angle will be assumed.

Initially, U is transmitting an acoustic sine wave, and D is receiving. A measurement of the signal transit time from U to D is taken. The time for the signal to travel from U to D will be decreased by the water flow speed along the signal path.

Then D is configured as the transmitter and U as the receiver. A measurement of the D to U transit time is made; in this case the signal transit time is increased by the water flow speed along the signal path. The two measurements are combined as described below to produce an estimate of the water flow speed that is independent of the speed of the signal in water.

Then tUD and tDU are calculated according to the equations shown in FIG. 6 (*a*) wherein c=speed of sound in water dw=distance of signal path in water tother=transit time of signal in potting material and delay through electronics tUD=transit time of signal from upstream to downstream piezoelectric element tDU=transit time of signal from downstream to upstream piezoelectric element s=water speed along signal path The objective is to find the water speed s. The speedometer electronics measure tUD and tDU. The distance in water dw is known by design, and tother is a small constant value that can be readily measured in a laboratory setting. So, letting t+=tUD−tother , and letting t−=tDU−tother, we get the equation 113 of FIG. 6.

For the diagrammed sensor configuration, the signal path is at a 45 degree angle to the fluid velocity, so the fluid speed is simply s. It is very important that the above equation is independent of the speed of sound c in the fluid. For application on a watercraft, this provides a means to accurately measure speed without calibration regardless of the water temperature or salinity.

In the preferred embodiment the applicant used the temperature method as follows:

At power-up, it is assumed that the boat is not moving at any significant speed, so that for our implementation (571 KHz, 2.25 inch spacing between sensors) the cycle count is either 20 or 21. The cycle tracking logic executes the following logic the first time through to determine the initial cycle count:

If phasetime<800 ns then cycle count=20 // unambiguously cycle 20 regardless of water temperature Else if phasetime>1200 ns then cycle count=21 // unambiguously cycle 21 regardless of water temperature.

Else if temperature<15 deg Celsius then cycle count=21. // very cold fresh water Else cycle count=20

// very warm salt water.

One approach to compute the transit time of a received signal is to measure its amplitude at predetermined sampling instants, and then convert the amplitude measurements to a phase shift, which then translates to a transit time. To do this the received signal must be accurately modeled with an invertible function giving amplitude as a function of time.

In the preferred embodiment, the function is a sine wave, and the received signal is modeled as:

$$A \sin(wt-(Phi)+dc,$$

where

A is the peak signal amplitude, w is the radian frequency

2(Pai)f, Phi is the phase shift introduced by the signal transit, and dc is the dc level introduced by the electronics.

A, Phi and dc are unknown. It is desired to estimate Phi using samples of the received signal.

The received signal is sampled at instants corresponding to 0, Pai/2, Pai, and 3/2 Pai radians on the transmitted wave quadrature plurality sampling corresponding to 0, 90 degrees, 180 degrees and 270 degrees respectively.

Let X=Equation 114 of FIG. 6

Let Y=Equation 115 of FIG. 6

Let U=Equation 116 of FIG. 6

Let V=Equation 117 of FIG. 6

Then Phi is estimated according to equation 118 of FIG. 6 and 2A is estimated according to equation 119 of FIG. 6

The phase can be estimated using just two samples (e.g. x,y or u,v), but by using quadrature or other plurality sampling, even harmonic components are canceled. The phase shift Phi is caused by the transit time t of the signal: Phi=(2Pai.f.t)mod(2Pai) resulting in equation 120 of FIG. 6

The parameter t' above is referred to as the phase time of the received signal. The phase time will only range over the period of 1 cycle of the transmitted sine wave, which in the preferred embodiment is 1.75 (sec.

For a transducer separation of 2 inches, the transit time can be anywhere from 32.6 (sec to 36.3 (sec, depending on the water temperature and salinity (sound speed ranges from 5100 ft/sec to 4600 ft/sec). That wide variation in transit time means that the received signal could be on any one three cycles (18, 19, or 20 cycles) and the phase shift measurement alone is ambiguous.

Thus, to measure the total transit time, the cycle which is currently being sampled must be kept track of. This can be simply done by keeping track of occurrences of phase times crossing the cycle time boundary.

Tracking the cycle count requires that at start up the number of the cycle being sampled must be determined unambiguously. This can be accomplished by measuring the water temperature and computing a range of valid sound speeds, which in turn determines a valid range of transit times which fall within one cycle. It can also be accomplished by transmitting a lower frequency signal with larger period, performing a phase measurement, and using that phase measurement to determine the received cycle count for the higher frequency signal.

The inventor has given a non-limiting description of the ultrasonic marine speedometer system of this invention. Due to the simplicity and elegance of the design of this invention designing around it is very difficult if not impossible. Nonetheless many changes may be made to this design without deviating from the spirit of this invention. Examples of such contemplated variations include the following:

1. The shape and size of the various members and components may be modified.
2. The color, aesthetics and materials may be enhanced or varied.
3. Signal sampling and processing parameters may be varied.
4. Instead of a solid state embodiment a mechanical embodiment or an electromechanical with electrical/electronic interface may be provided.
5. Additional complimentary and complementary functions and features may be added.

Other changes such as aesthetics and substitution of newer materials as they become available, which substantially perform the same function in substantially the same manner with substantially the same result without deviating from the spirit of the invention may be made.

Following is a listing of the components uses in this embodiment arranged in ascending order of the reference numerals for ready reference of the reader.

10=Marine Speedometer System Generally

12=Watercraft eg. sail boat, power boat marine vessel.

14=Transom of watercraft 12

16=Conductors for asynchronous communications eg RS-232

18=Display

20=Upstream Piezoelectric Transducer

21=Downstream Piezoelectric Transducer

22=Processing electronics

24=Mounting bracket

28=Fin on the speedometer housing

29=Fin on the speedometer housing

30=Cavity (Upstream)

31=Cavity (Downstream)

34=Electrical conductor

35=Electrical conductor

40=Closed cell foam corner reflector

50=Micro-controller

52=Transmit/Receive Control Pins

54=driver

56=Switch

58=Switch

60=Filter

62=Amplifier

64=Analog to Digital Converter

66=Parallel Input Port

67=Sampling clock pulse signal

68=Sampling clock generator

72=Divider

73=Transmit Signal

74=Oscillator
76=Temperature Sensor
80=Initialization and start-up process
82=Set Transmit/Receive Control to downstream
84=Quadrature Sampling Received Signal Downstream
86=Set Transmit/Receive Control to upstream
88=Quadrature Sampling Received Signal upstream
90=Phase times saving step
92=Calculation of new phase times
94=Adjustment of times upstream/downstream
96=Updating of NoofCycles
98=Computation of signal transit time
100=Speed computation
102=Conversion of speed to ASCII decimal number
111=Downstream Time Equation
112=Upstream Time Equation
113=Water speed calculation equation
114=Plurality/Quadrature sampling X equation
115=Plurality/Quadrature sampling Y equation
116=Plurality/Quadrature sampling U equation
117=Plurality/Quadrature sampling V equation
118=Phi approximation equation
119=2A calculation equation
120=Phase time computation

DEFINITIONS AND ACRONYMS

A great care has been taken to use words with their conventional dictionary definitions. Following definitions are included here for clarification.

| | |
|---|---|
| 3D | = Three Dimensional |
| ASCII | = American Standard Code for Information Interchange |
| Integrated | = Combination of two entities to act like one |
| Interface | = Junction between two dissimilar entities |
| MPH | = Miles Per Hour |
| Symmetrical | = The shape of an object of integrated entity which can be divided into two along some axis through the object or the integrated entity such that the two halves form mirror image of each other. |
| Synchronous sampling | = Using a common reference clock to generate both the transmitted signal and the A/D sampling instants on the received waveform. |
| Ultrasonic | = a device or system pertaining to or utilizing ultrasound. |

While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description. It is therefor contemplated that the appended claim(s) cover any such modifications, embodiments as fall within the true scope of this invention.

What is claimed is:

1. In a fluid flow measurement system including at least two spaced apart electro-acoustic transducing means, a process for determining ultrasonic signal transit times along a bi-directional signal propagation path between the transducing means, including the steps of:

a) causing a first one of the transducing means to generate a continuous wave acoustic signal in a first direction and receiving the continuous wave acoustic signal at the second transducing means;

b) causing the second transducing means to generate the continuous wave acoustic signal in a second direction opposite to the first direction, and receiving the continuous wave acoustic signal at the first transducing means; and c) determining respective signal transit times corresponding to propagation between the transmission means in the first and second directions based on synchronously sampling the received continuous wave and determining a transit time based upon direct inverse function computation of the samples.

2. The process of claim 1 wherein the system further includes a temperature measurement means to determine the transit time of the acoustic signal in environments or transducer separations where the transit time may vary over greater than one cycle of the acoustic signal.

3. An apparatus for measuring the speed of a watercraft relative to the water through which it travels, the apparatus providing an electrical output to a display device proportional to the relative speed of the watercraft, the apparatus comprising:

a) a body member having an upper housing for mounting of signal generating and processing means, and two streamlined fins mounted to the upper housing and configured to extend below the bottom of the watercraft hull, wherein the water generally flows past the fins from the front edge to the back edge of the fins when the watercraft moves relative to the water;

b) a cavity in each streamlined fin for the mounting of an electro-acoustic transducer, and a path in the streamlined fins for conducting means between the transducer and the signal generating and processing means in the upper housing;

c) a mounting bracket connected to the upper housing to mount the body portion to the watercraft so that the fins extend below the bottom of the watercraft hull.

4. A process for measuring the speed of a watercraft system relative to the water through which it travels utilizing ultrasonic flowmetrics comprising the steps of:

a) initializing the system parameters;

b) sending, receiving, plurality sampling and measuring downstream and upstream signals;

c) calculating phase times of said received signals;

d) calculating transit times of said upstream and downstream signals by utilizing said phase times;

e) computing speed of said watercraft;

f) converting said speed of said water craft into an ASCII decimal number;

g) communicating said number via an a synchronous communication link to a display device; and h) displaying said number on said display device.

5. In a fluid flow measurement system including at least two spaced apart electro-acoustic transducing means, a process for determining ultrasonic signal transit times along a bi-directional signal propagation path between the transducing means, including the steps of:

a) causing a first one of the transducing means to generate a continuous wave acoustic signal in a first direction and receiving the continuous wave acoustic signal at the second transducing means;

b) causing the second transducing means to generate the continuous wave acoustic signal in a second direction opposite to the first direction, and receiving the continuous wave acoustic signal at the first transducing means; and c) determining respective signal transit times corresponding to propagation between the transmission means in the first and second directions based on synchronously sampling the received continuous wave and determining a transit time based upon direct inverse function computation of the samples; and wherein a lower frequency acoustic wave is first transmitted and measured to determine the approximate transit time of the acoustic signal in environments or transducer separations where the transit time may vary over greater than one cycle of the higher frequency acoustic signal.

6. A signal generating and processing apparatus for a fluid velocity measuring system, including:

a) a plurality of electro-acoustic transducing means mounted in spaced apart relation to one another within a fluid flow, said transducing means cooperating to define a set of linear bi-directional acoustic signal paths comprised of one of said paths between each pair of the transducing means;

b) a reference clock means used for generating an electrical signal for transmission, and for sampling a received electrical signal in a synchronous fashion with respect to the transmitted signal;

c) a signal generating means for generating an electrical signal in the form of a continuous wave to be applied to an electro-acoustic transducing means;

d) a detecting means coupled to the transducing means for sensing the received continuous wave;

e) a synchronous sampling means for sampling the received signal at time instants fixed in relation to the electrical signal generated by the signal generating means;

f) an analog-to-digital conversion means for generating digital representations of the instantaneous received signal voltage at time instants determined by the synchronous sampling means; and g) a first computing means coupled to said analog-to-digital conversion means for calculating, with respect to each path, an acoustic signal transit time, and further calculating the reciprocal of the acoustic signal transit time, and further calculating the difference of the reciprocal times corresponding to the two directions along each path for the purpose of further calculating the speed of the fluid flow between the transducing means; and h) an inverse function computing means connected to said first computing means; and wherein (i) a first multiplexing means connected to the continuous wave generator provides an output to a selected transducing means individually and exclusively;

(ii) a second multiplexing means provides an input to the connected detecting means from a selected transducer means individually and exclusively;

(iii) said electro-acoustic transducing means comprises a plurality of ultrasonic transducers, each said ultrasonic transducer including a housing, a potting means to insulate the ultrasonic transducer from the conducting and corrosive effects of the fluid being measured; and (iv) a temperature sensing element mounted in said potting means responsive to temperatures to said potting means.

* * * * *